United States Patent [19]
Taubert

[11] Patent Number: 5,635,800
[45] Date of Patent: Jun. 3, 1997

[54] BALLAST CIRCUIT WITH A JAPPED TRANSFORMER FLYBACK CONVERTER PROVIDING DRIVING ENERGY FOR START, GLOW AND RUN MODES OF A LAMP

[75] Inventor: Timothy A. Taubert, Kirtland, Ohio

[73] Assignee: General Electric Company, Schenectady, N.Y.

[21] Appl. No.: 601,889

[22] Filed: Feb. 15, 1996

Related U.S. Application Data

[63] Continuation of Ser. No. 335,219, Nov. 7, 1994, abandoned, which is a continuation of Ser. No. 989,304, Dec. 11, 1992, abandoned.

[51] Int. Cl.$^6$ .................................................. H05B 37/00
[52] U.S. Cl. ........................... 315/175; 315/DIG. 5; 315/307; 315/171; 315/205; 315/277; 315/282; 315/200 R
[58] Field of Search .................. 315/76, 171, 172, 315/175, 205, 200 R, 277, 279, 282, 289, 307, DIG. 5, 241 R, 219, 209 R; 363/21

[56] References Cited

U.S. PATENT DOCUMENTS

| | | | |
|---|---|---|---|
| 4,550,272 | 10/1985 | Kimura et al. | 315/86 |
| 4,749,913 | 6/1988 | Stuermer et al. | 315/175 |
| 5,144,204 | 9/1992 | Nerone et al. | 315/209 R |

FOREIGN PATENT DOCUMENTS

| | | | |
|---|---|---|---|
| 0604203 | 4/1978 | U.S.S.R. | 315/241 R |

Primary Examiner—Robert Pascal
Assistant Examiner—Arnold Kinkead
Attorney, Agent, or Firm—George E. Hawranko

[57] ABSTRACT

Circuit arrangements generate start, glow, and/or run signals to be applied to and for operating a DC arc discharge lamp. A first circuit arrangement provides start, glow, and run signals. The first circuit arrangement includes a tapped transformer flyback converter circuit for combining the start and glow functions; a buck/boost converter for providing the run function; and blocking diodes for providing a blocking function for the glow circuit during the start and run modes, and further for providing a blocking function for the run circuit during the start and glow modes. A second circuit arrangement provides start and glow functions, and includes a tapped transformer flyback converter circuit for combining the start and glow functions; and a blocking diode for providing a blocking function for the glow circuit during the start mode. A third circuit arrangement includes a buck/boost converter for providing glow and run functions, and further includes an inductive storage element, such as an inductor. A fourth circuit arrangement includes a single buck/boost converter for providing start, glow, and run signals, and further includes an inductive storage element, such as an inductor. In all of the circuit arrangements, a switching device controls energy transferred through the inductive storage element, which is either a tapped transformer or an inductor. A measurement and control circuit measures a voltage and provides a control signal in response thereto, for controlling the switching device.

8 Claims, 4 Drawing Sheets

1

BALLAST CIRCUIT WITH A JAPPED TRANSFORMER FLYBACK CONVERTER PROVIDING DRIVING ENERGY FOR START, GLOW AND RUN MODES OF A LAMP

This is a continuation of application Ser. No. 08/335,219, filed on Nov. 7, 1994, now abandoned, which is a continuation of application Ser. No. 07/989,304, filed Dec. 11, 1992, now abandoned.

TECHNICAL FIELD

The present invention relates to high intensity discharge lamps and, more particularly, to a ballast circuit for allowing the run function and the start and glow functions of a DC high intensity discharge lamp to be implemented using a buck/boost converter topology with a magnetic storage device and a switching device.

BACKGROUND ART

Lamps that establish an electric discharge through a gas medium as a means of converting electrical energy into light are classified as electric discharge lamps. One such discharge lamp is a high intensity discharge (HID) lamp that may employ DC type signals developed by ballast circuits for its operation commonly in three modes. The three modes, usually provided by off-line electronic ballasts used for DC HID lamps, include a start circuit, a glow circuit, and a run circuit. The glow function is provided by a high DC link voltage or a voltage doubler circuit across the mains, and a separate linear current limitation device, such as a FET or transistor device, which is switched off by a control circuit when the DC HID lamp is in the run mode.

In the first mode, which is the starting mode, a relatively high value of a DC type starting voltage is necessary to be applied across the electrodes of the HID lamp so as to first place the gases within the lamp in a suitable ionization condition to allow striking or initiating a discharge condition of a glow state or mode. The start circuit is usually a high voltage pulsed DC or a high voltage DC source requiring at least one switching element and one inductive storage element, such as a standard or autotransformer type flyback circuit.

The second mode is the glow mode, which is maintained for a predetermined time to allow the electrodes and the gases to be placed into a state that will sustain an arc condition between the electrodes of the lamp for the purpose of warming the electrodes to a thermionic emission state needed for a run mode. The glow function is provided by a high DC link voltage or a voltage doubler circuit across the mains, and a separate linear current limitation device, such as a FET or transistor device, which is switched off by a control circuit when the DC HID lamp is in the run mode.

The third mode is a steady state or run mode. Initially, the run mode is at a minimum voltage, or $V_{min}$, condition, wherein the electrodes are in a thermionic emission state, but the column of gas is cool. The $V_{min}$ state is the lowest voltage in the run mode, and is typically around 20 volts. As the voltage builds up to a run voltage, which can be anywhere from 50 to 140 volts, the arc discharge of the lamp generates a desired light output at a relatively low or moderate voltage which occurs between the electrodes of the lamp. A forward converter can be used to provide the run function for a DC HID lamp. However, a forward converter requires a reset winding, more sophisticated control circuitry, and/or extra switching components to make sure the core resets. Unfortunately, this adds cost and complexity to the converter. Additionally, transformer losses must be dealt with.

U.S. Pat. No. 4,749,913 of Stuermer et al, assigned to the same assignee as the present invention and herein incorporated by reference, discloses a DC ballast circuit for operating a HID lamp in the start, glow, and run modes of operation. Similarly, U.S. Pat. No. 4,574,219 of Davenport et al, assigned to the same assignee as the present invention and herein incorporated by reference, discloses a lighting unit having a ballast circuit and a spot mode electrode that function to eliminate the need of the glow mode so as to provide the related gas discharge lamp with only the start and run modes of operation. While the ballast circuits of both of these patents serve well their desired needs, they have limitations with regard to the acceptable variations of amplitude and frequency parameters of the AC source applied to the ballast circuits.

One of the limitations of the prior art ballast circuits, is that the amplitude of the AC signal applied to the ballast circuit for rectification thereby should be of a sufficiently high value so that the proportionate amount capable of being derived by the rectifying means is sufficient to supply the level of the DC signal needed to operate the HID lamp in the glow and run modes. If the voltage of the applied AC signal drops below this sufficiently high value, the ballast circuit is not able to develop a DC level sufficient to maintain the arc condition of the HID lamp.

Existing HID ballasts for DC arc tubes usually incorporate a high voltage pulse starting technique and rely on a high mains voltage or a voltage doubler circuit to provide the glow function. Existing glow systems require several high voltage transistors and/or other switching devices to provide both the start and the glow functions. Since existing glow systems use linear regulation methods and the voltage across the linear current regulation device may be quite large, depending on the lamp glow and minimum voltages and the time required to go through the glow period. The instantaneous power stresses are high in these limiting devices, and the limiting devices are expensive and bulky. Control functions must be added to limit the power or time of the glow mode event, and to turn off the glow circuit during run mode.

In some existing glow systems, a separate converter circuit can be used to provide the glow function and is typically added to the existing start and run circuits with diodes. Unfortunately, this means that added magnetic storage devices, switching devices, and control circuitry are needed, all of which add to the complexity and cost of the ballast circuitry.

It is seen then that there exists a need for a simplified ballast circuit which overcomes the problems of complexity and expense encountered in the prior art.

SUMMARY OF THE INVENTION

This need is met by the system and method according to the present invention, wherein the start, glow, and run functions of a DC HID lamp can be implemented using only one magnetic storage device and one switching device. The technique of the present invention is applicable to off-line electronic ballasting systems and employs a tapped transformer for providing start, glow and run functions of a DC HID lamp. The line voltage applied to the ballast circuits can be in the 100 VAC to 277 VAC range with HID lamps having medium to high glow voltages, on the order of 150 VDC to over 1000 VDC. The present invention is particularly advantageous when the AC line voltage produces a DC link voltage lower than the glow voltage requirement, or the maximum open circuit voltage of the run circuit is below the maximum glow voltage requirement, of a DC HID lamp.

In accordance with one aspect of the present invention, a circuit arrangement generates start, glow, and run signals to be applied to and for operating a DC arc discharge lamp. The circuit arrangement includes a tapped transformer for combining the start and glow functions and also for operating as an energy transfer element. A switching device controls energy transferred through the tapped transformer. Diodes provide a blocking function for the glow circuit during the start mode and a blocking function for the run circuit during the start and glow mode. A measurement circuit measures a voltage and provides a control signal in response thereto, and a control circuit responsive to the measurement circuit controls the switching device. A buck/boost converter provides the run signals.

Accordingly, it is an object of the present invention to provide a tapped transformer flyback technique to combine the glow and start circuit functions for DC HID lamps with medium to high glow voltage requirements, in off-line electronic or electromagnetic ballasts with line voltages in the 100 VAC to 277 VAC range. It is a further object of the present invention to introduce a converter topology using a buck/boost converter and inductive output filtering to achieve a universal type ballast run or glow and run circuit for DC HID lamps with medium to high glow and run voltage requirements ($40 < V_{run}/V_{glow} < 500$ V), in off-line electronic ballasts with nominal power line voltages in the 100 VAC to 277 VAC range. It is an advantage of the present invention that the maximum start and glow voltages can be limited using only one limit circuit and the properties of tapped transformers.

Other objects and advantages of the invention will be apparent from the following description, the accompanying drawings and the appended claims.

DETAILED DESCRIPTION OF THE PREFERRED EMBODIMENTS

Figure 1A:
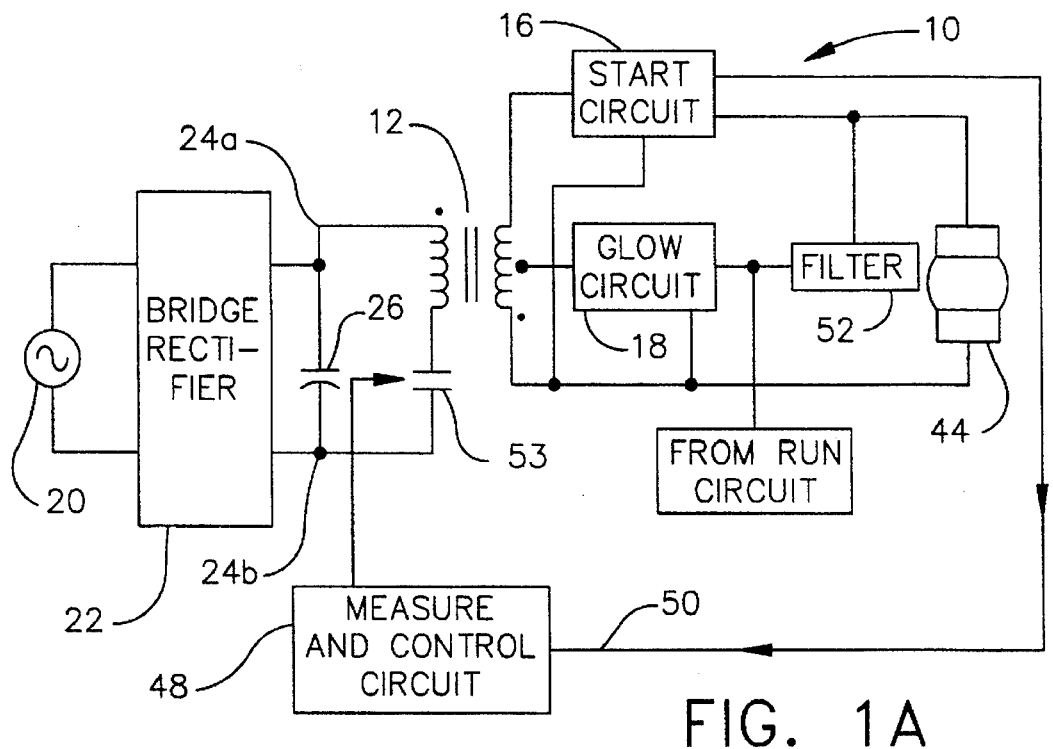
FIGS. 1A and 1B are schematic block diagrams of a start and glow circuit using a standard flyback transformer, in accordance with one embodiment of the present invention.
Figure 1B:
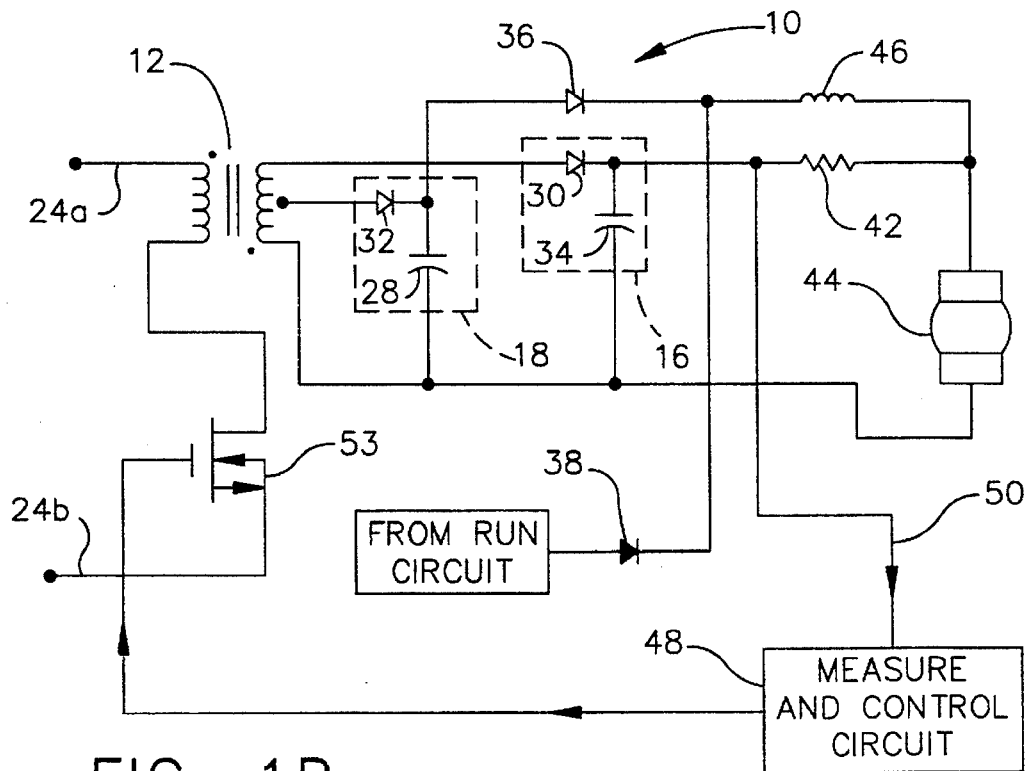
Figure 2A:
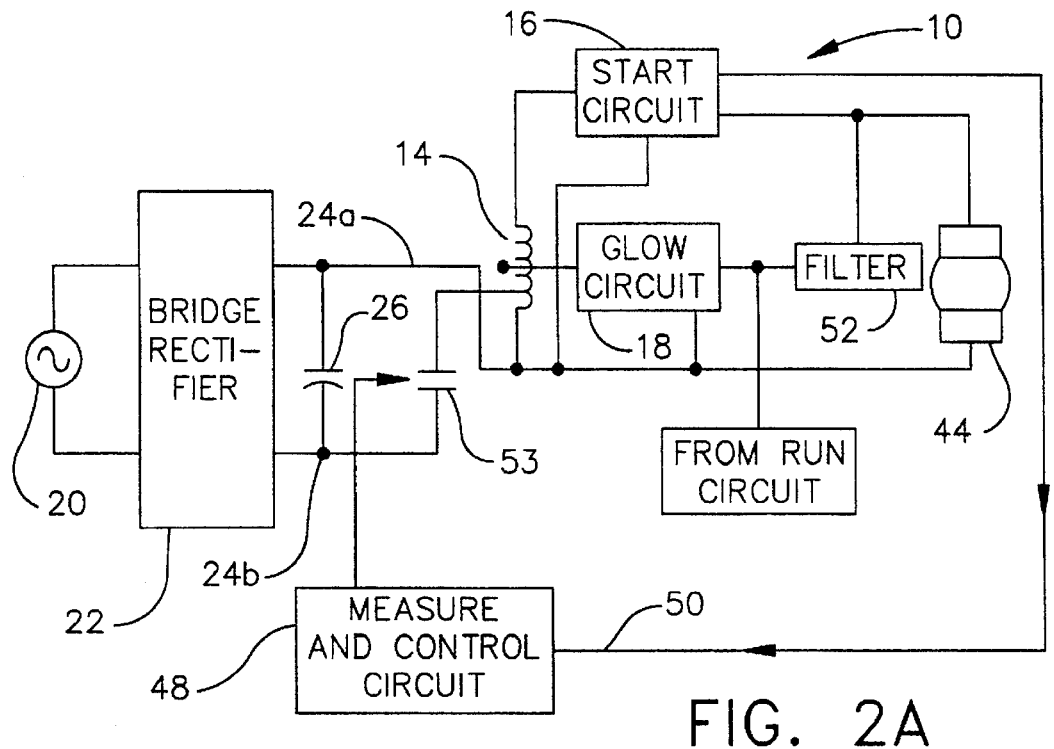
FIGS. 2A and 2B are schematic block diagrams of a start and glow circuit using an autotransformer, in accordance with an alternative embodiment of the present invention.
Figure 2B:
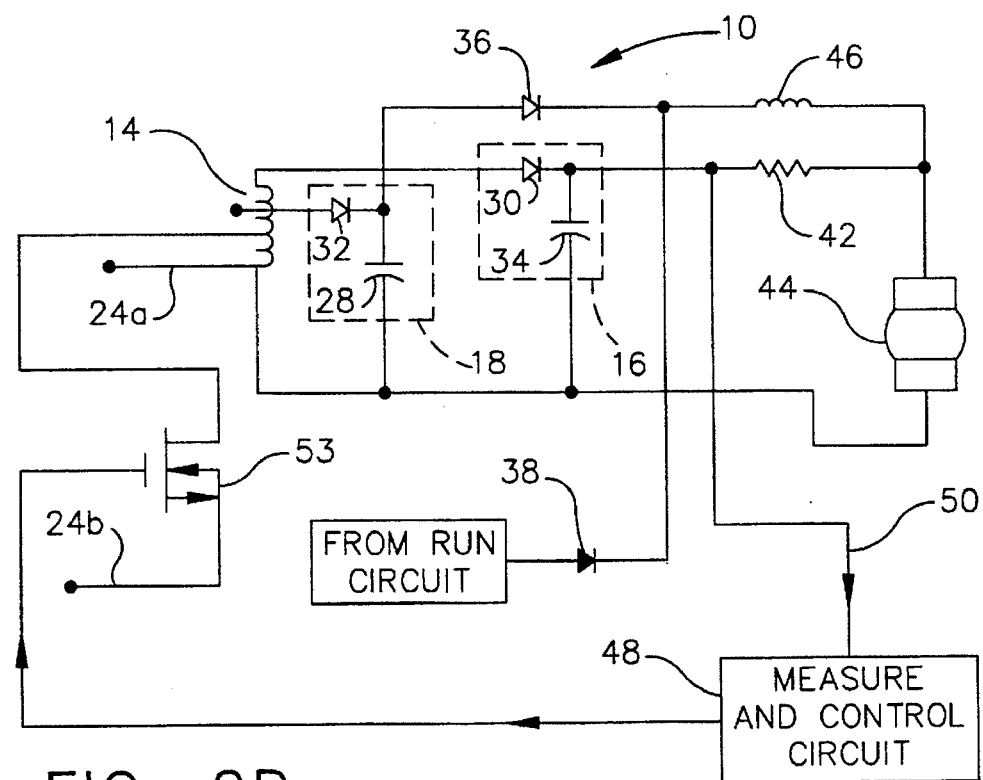

Referring now to the drawings, FIGS. 1A, 1B, 2A, and 2B illustrate schematic block diagrams of a circuit 10 for combining the start and glow functions of a DC arc discharge lamp, in accordance with the present invention. FIGS. 1A and 1B depict a block diagram and a circuit diagram, respectively, of one embodiment of the combined start and glow concept of the invention using a standard flyback transformer 12, and FIGS. 2A and 2B depict a block diagram and a circuit diagram, respectively, of an alternative embodiment of the combined start and glow concept of the invention using an autotransformer 14. The transformers 12 and 14 are each associated with a start circuit 16 and a glow circuit 18. An AC voltage source 20 provides voltage through a bridge rectifier 22 to a DC link 24a and 24b, where 24a is the positive side and 24b is the common side. The bridge rectifier 22 converts the AC signal into full wave DC, which is filtered by capacitor 26. Capacitor 26 also stores the energy then transferred by transformer 12 or 14 to the start and glow circuits 16 and 18.

The transformer 12 or 14 is tapped to reduce the time required to transfer current to a storage capacitor 28 of the glow circuit 18 by reducing the inductance at the tap as compared to across the whole transformer output winding. Because of the tap, the flyback converter output can work over the entire start and glow range within a reasonable duty cycle range. The tap allows the single tapped transformer 12 or 14 to combine the start and glow functions of circuits 16 and 18.

Continuing with FIGS. 1A, 1B, 2A, and 2B, freewheeling diodes 30 and 32, for the start circuit 16 and the glow circuit 18, respectively, are added to the output of the tapped transformer 12 or 14 to direct start and glow energy in pulse form to storage capacitors 34 and 28, for the start circuit 16 and the glow circuit 18, respectively. A first DC blocking diode 36 blocks the glow function from the run and start functions, providing a DC blocking path from the high voltage of the start circuit 16 to the lower voltage of the glow circuit 18 during the start mode. A second DC blocking diode 38 is used to isolate a run circuit 40 (see FIG. 3A) from the start and glow circuits 16 and 18, providing a blocking function for the run circuit 40 during the start and glow mode. The run circuit 40 will be described in more detail with reference to FIGS. 3A and 3B.

A high value resistor 42 is added between the point where the start circuit 16 is connected to a lamp 44 so the start voltage is not depleted or clamped by the lamp 44 dropping into the glow mode. Depending on diode leakages in diode 36 compared to leakages in capacitor 28, another resistor or clamp (not shown) may be added across capacitor 28. This resistor, if added, may also be provided as a discharge path for capacitor 28 when the ballast circuit is turned off, thus reducing the risk of shock.

Directing the glow circuit 18 output through an inductor 46 shared by both the glow circuit 18 and the run circuit 40 allows for output filtering in both the glow and run circuits with a single inductive device which has the advantages of reducing the cost and size of the circuit. The resistor 42, used to filter the start circuit 16, and the inductor 46, used to filter the glow circuit 18 and the run circuit 40, may be used as filter elements 52 for affecting the current to the lamp 44.

The properties of the tapped transformers 12 and 14 permit voltage limiting control of both the start and glow voltages using a single measure and control circuit 48 for measuring either the start or glow voltage, and providing a control signal in response thereto. If the start voltage is measured by an over voltage limiting circuit, the glow voltage will be limited to the ratio of turns to the tap point to the total turns of the tapped winding. A voltage limit 50 is shown in FIGS. 1A, 1B, 2A and 2B as being from the start circuit 16. The control signal from the measure and control circuit 48 controls a FET switch 53, and a set-point within the measure and control circuit 48 can control the power to the lamp during the glow mode.

Figure 3A:
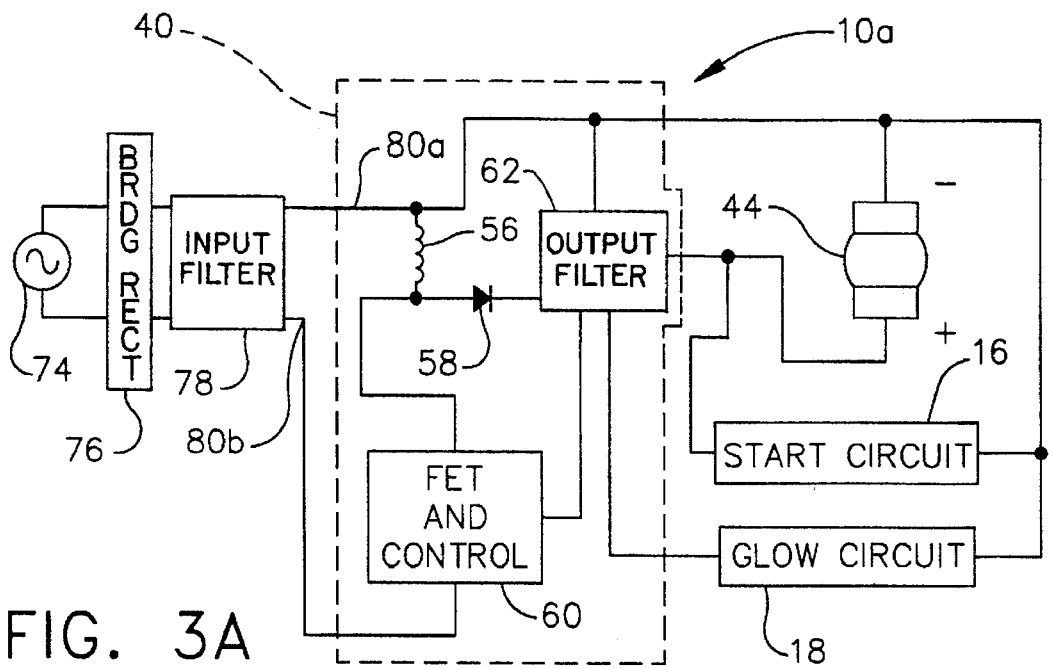
FIGS. 3A and 3B are schematic block diagrams of a run circuit using a buck/boost converter topology, which may be used with the start and glow circuits of FIGS. 1A, 1B, 2A, and 2B.
Figure 3B:
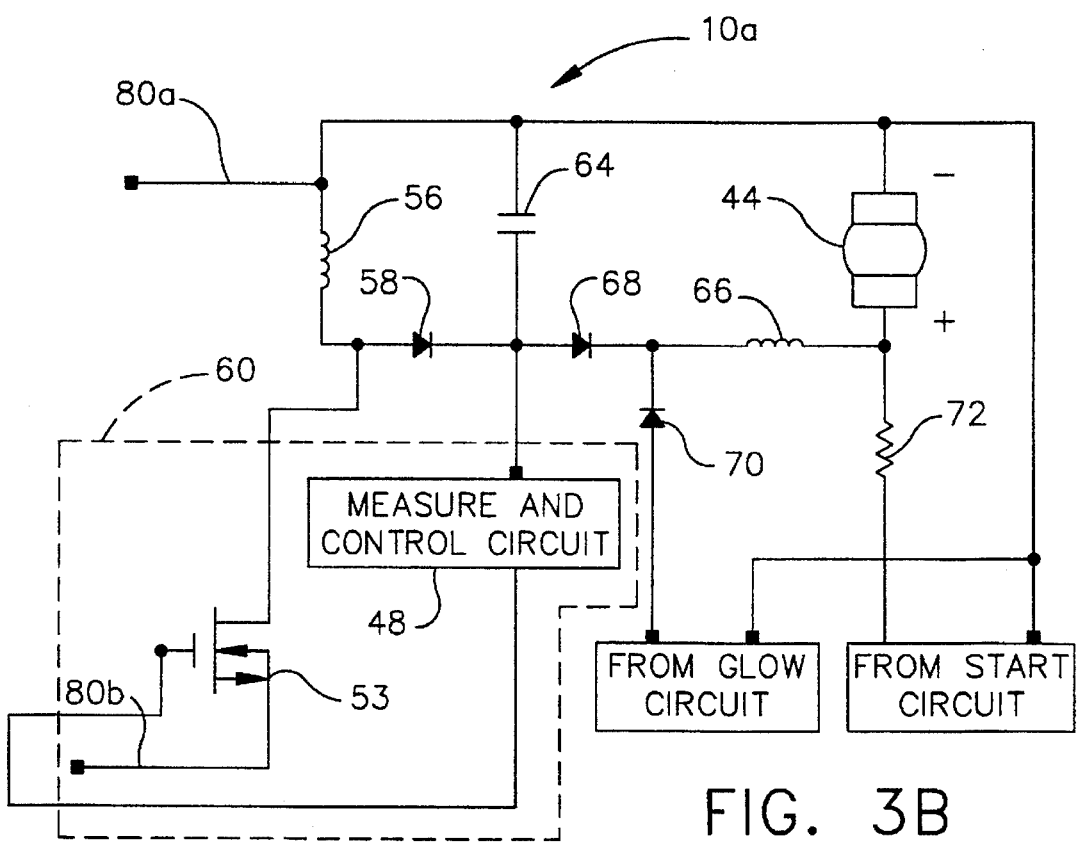

Referring now to FIGS. 3A and 3B, there is depicted a block diagram and a circuit diagram, respectively, of one embodiment of a circuit 10a employing a buck/boost converter 40, operating as run circuit 40 for providing the run function in FIGS. 1A, 1B, 2A, and 2B. The start and glow circuit of FIGS. 1A and 1B, or 2A and 2B, can be combined with the run circuit of FIGS. 3A and 3B, to create a first circuit arrangement for providing start, glow, and run signals.

In FIGS. 3A and 3B, the buck/boost converter run circuit 40, which runs in a flyback mode, is comprised of an inductor 56, a freewheeling diode 58, an output filter element 62, a FET 53, and a measure and control circuit 48. The FET 53 and the measure and control circuit 48 comprises a control means 60. The embodiment illustrated in FIGS. 3A and 3B is particularly useful in instances where the glow voltage requirements of the DC HID lamp are so high that it is impractical within the component limitations of power FET's to find a power FET with a voltage rating and current rating simultaneously high enough to provide the run, glow, and start functions.

The output filter element 62 is shown by way of example as a single capacitor and inductor type filter, including a capacitor 64 and an inductor 66, such that the storage capacitor is separated from the lamp 44 by the inductor 66. This arrangement is shown by way of example only, as being practical and cost effective, and is not to be considered as limiting the invention. The capacitor 64 may be replaced by a pi filter, if desired, or if improved filtering of the converter 40 frequency is required. It is important that the inductance is large enough to prevent the lamp 44 from running away, which is a characteristic of HID lamps driven with capacitive loads. Typically, if the maximum energy storage of the inductor 66 ($E_{max}=\frac{1}{2}L*[I_{saturation}^2-I_{run}^2]$) is greater than or approximately equal to the maximum energy stored in the capacitor ($E_{max}=\frac{1}{2}(C*V_{max}^2)$), then the lamp 44 will not tend to run away and the system is stable. Also, for best results, the inductor 66 should have low parasitic capacitance.

The output filter 62 may also include an internal blocking diode 68 to isolate the run circuit from the start and glow circuit voltages. Depending on the leakage currents of the blocking diode 68 as compared to the leakage currents of capacitor 64 and diode 58, a resistor or Zener may need to be placed in parallel with the capacitor 64 to reduce the effects of the leakage currents of diode 68. Another blocking diode 70 is included in the circuit 10a for isolating the glow circuit 18 from the run circuit 40 and the start circuit 16. A resistor 72 is included in the circuit 10a for decoupling the start circuit 16 from the run circuit 40 and the glow circuit 18. Alternatively, the resistor 72 could be replaced with a diode, if preferred by the starting means, such as, for example, a pulsed start.

Continuing with FIGS. 3A and 3B, the circuit 10a comprises an AC input 74 for providing voltage through a bridge rectifier 76 and an input filter 78 to a DC link 80a and 80b, where 80a is the positive side and 80b is the common side. Filtering of the rectified AC line, used to provide the power source for the ballast, provides the energy storage for each converter cycle to draw from. The buck/boost converter 40 permits operation of lamp 44 at, above, or below the voltage of the rectified and filtered AC line input. The capacitive and inductive output filter 62 is seen by the lamp 44 as inductive, so the inductive impedance the lamp 44 sees permits stable operation of the lamp 44. The combination makes an extremely versatile ballast circuit capable of providing the run function and, in alternative embodiments discussed below in reference to FIGS. 4 and 5, providing glow and start requirements, for DC HID lamps. The converter topology allows for simple lamp current regulation and lamp power regulation.

Figure 5:
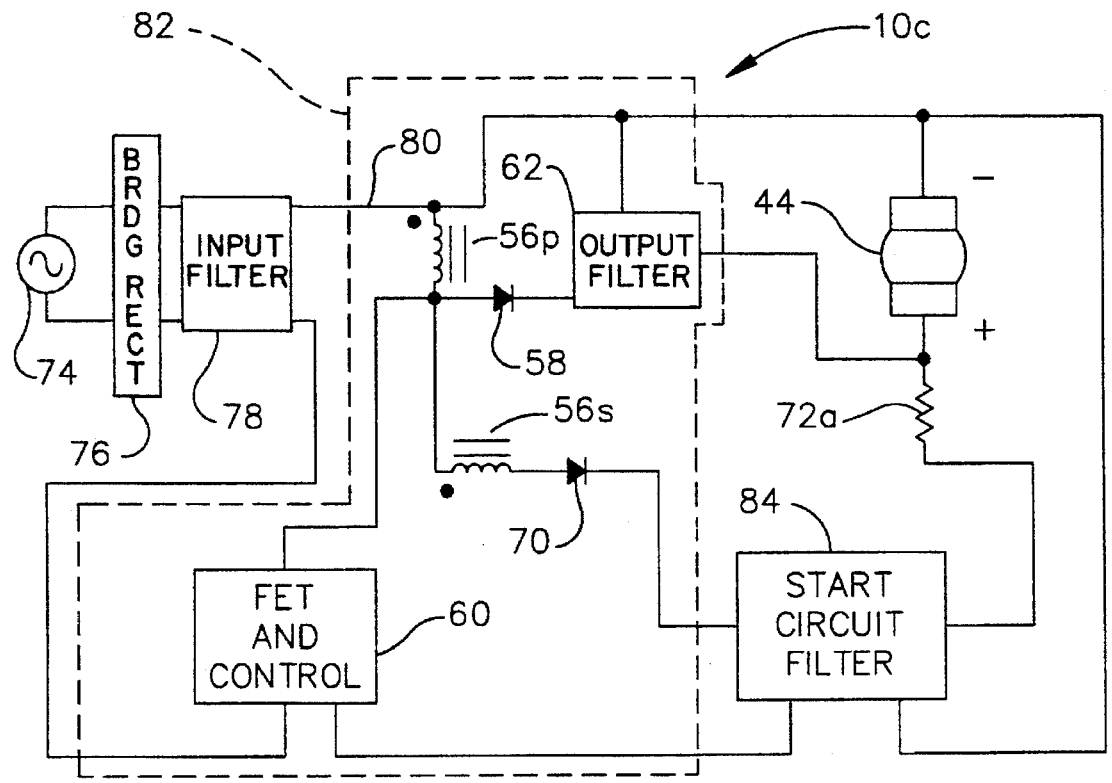

The buck/boost inductor 56 (or autotransformer as shown in FIG. 5) ramps up to a desired final current when the power switch 53, usually a FET, turns on. When the switching means 53 is turned off, the inductor 56 flies back to try and keep its current flowing. The freewheeling diode 58 turns on and allows the inductor 56 to give up its energy to the capacitor 64 of the output filter 62.

Figure 4:
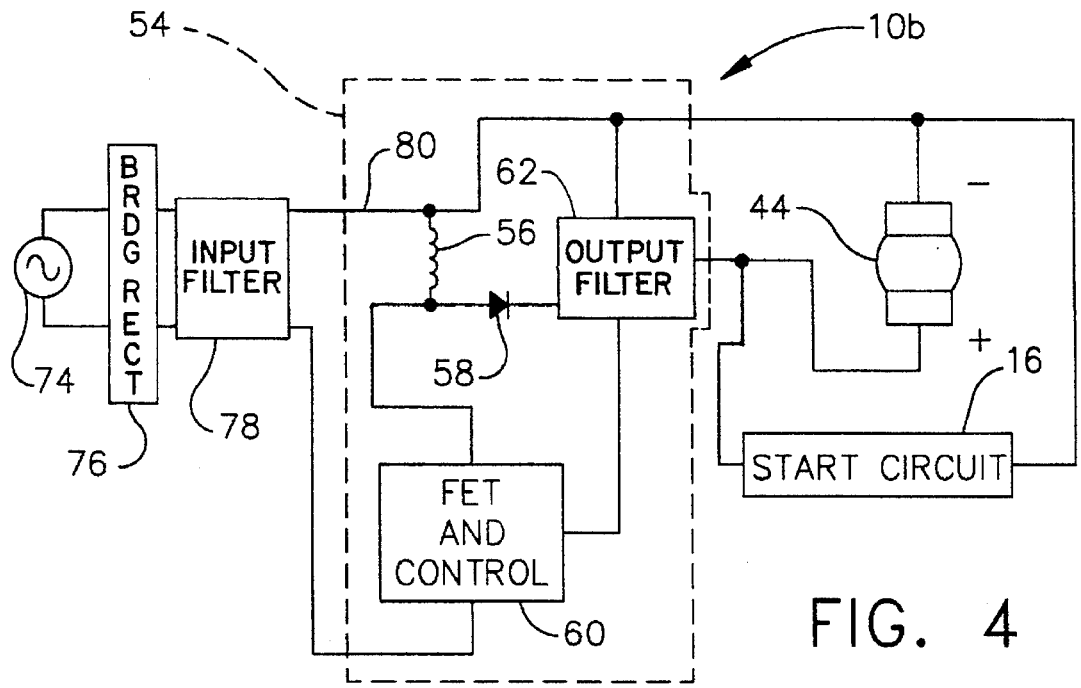
FIGS. 4 and 5 are schematic block diagrams of alternative embodiments of the run circuit of FIGS. 3A and 3B, illustrating in FIG. 4 a run and glow circuit which would incorporate a separate start circuit; and illustrating in FIG. 5 a run, glow and start circuit using a single buck/boost converter topology.

Referring now to FIG. 4, an embodiment of a circuit 10b for providing both the glow and the run functions for the DC HID lamp 44 is illustrated. The embodiment illustrated in FIG. 4 is similar to the circuit 10a of FIGS. 3A and 3B, with a buck/boost converter 54 for providing the glow and the run functions, rather than only the run function, as illustrated in FIGS. 3A and 3B. Depending on the lamp, ballast, and components available, and the line voltage being used, it may be desirable to employ the embodiment of FIG. 4, using the buck/boost converter 54 to provide both the glow and the run functions. If the output of the run circuit can provide a low power glow function at a high enough glow voltage, then, for certain lamps, the embodiment shown in FIG. 4 can be used. In FIGS. 3A and 3B, the buck/boost converter run circuit 40 is providing only the run function; whereas in FIG. 4, the buck/boost converter glow and run circuit 54 provides both the glow and the run functions.

Referring now to FIG. 5, an embodiment of a circuit 10c for providing all three lamp functions, including the start, glow and run functions, for the DC HID lamp 44 is illustrated. The embodiment illustrated in FIG. 5 is similar to the circuit 10a of FIGS. 3A and 3B, but takes advantage of the flyback properties of a buck/boost converter 82 to also provide the start function for the DC HID lamp 44, in addition to providing the glow and run functions. Of course, using the single buck/boost converter 82 to provide the start, glow, and run functions in the embodiment of FIG. 5 may require additional circuitry.

In FIG. 5, the buck/boost inductor 56 has a winding added to make it an autotransformer configuration, and includes a primary winding 56p and a secondary winding 56s. The secondary winding 56s leg provides the start function; the primary winding 56p leg, along with the output filter 62 and the buck/boost diode 58, provide the run and glow functions.

In FIG. 5, the primary 56p works the same as the inductor 56 does in FIGS. 3A and 3B. When the switch 53 of FIG. 5 turns on, the current of the autotransformer ramps up either to a desired maximum current, or for a specified on time, depending on the control method. The switch 53 is then turned off and the autotransformer flies back until the freewheeling diode 58 turns on. Then the current in the autotransformer decreases, transferring the stored energy into capacitor 64 (see FIG. 3B) of the output filter 62. The secondary winding 56s and the primary winding 56p both fly back at the same time. The voltage at the secondary winding is proportional to the voltage of the primary winding, as related by the turns ratio. A capacitor may be employed to charge up to this proportional voltage as the freewheeling diode 70 (see FIG. 3B) turns on.

Continuing with FIG. 5, a resistor 72a provides the isolation of the start circuit 16 from the run and glow circuit or circuits, and keeps the primary winding 56p from being clamped by the secondary winding 56s after the lamp 44 breaks down (starts). The value of the resistor 72a is chosen such that it is high enough to reduce the loss through the resistor 72a during the run mode to less than a few percent of the output power. The value of resistor 72a must be low enough to provide the required high voltage into the leakage resistance (or current) of the lamp 44 during the start mode of the DC HID lamp 44. During the run mode, the secondary winding 56s gives current to the lamp via the resistor 72a, and some amount of power is transferred to the lamp 44 from the start circuit 16, via a start circuit filter 84. In its simplest form, the start circuit filter 84 is a capacitor.

In the run mode, the internal blocking diode 68 (see FIG. 3B) of the output filter 62 turns on and stays on, and current is allowed to pass from the capacitor of the output filter, through the inductor of the output filter, to the lamp 44. The internal capacitor and inductor of the output filter provide the output filtering exactly as in the embodiment shown in FIGS. 3A and 3B. The internal blocking diode of the output filter 62 provides the isolation of the buck/boost output from the start circuit 16.

The present invention introduces a system and method whereby the run function and a combined start and glow function of a DC HID lamp can be implemented using a buck/boost converter topology and additional circuitry. The buck/boost converter may be used to provide only the run function (FIGS. 3A and 3B), the glow and run functions (FIG. 4), or the start, glow, and run functions (FIG. 5), depending on the available components and circuit requirements. Inductive output filtering must be added to assure proper operation of the lamp. This combined circuitry becomes an all purpose means of ballasting DC HID lamps because it can drive DC HID lamps at voltages higher, at, or lower than the DC link voltage, which is the rectified and filtered voltage.

With the present invention, $V_{min}$, Run, Glow, and Start functions can all be accomplished with one converter circuit. For this technique, the nominal line voltage applied to the ballast circuits can be in the 100 VAC to 277 VAC range with HID lamps having medium to high run voltages (40 $V_{DC}$ to greater than 250 $V_{DC}$). This is especially useful when the AC line voltage produces a DC link voltage near, or below, the DC lamp voltage. Current or power regulation of the lamp is easily accomplished with the converter topology, and power factor correction is achievable with the same circuit topology by way of the control function.

The invention has been described in detail with particular reference to certain preferred embodiments thereof, but it will be understood that modifications and variations can be effected within the spirit and scope of the invention.

What we claim as new and desire to secure by Letters Patent of the United States is:

1. A circuit arrangement for generating start, glow and run signals to be applied to and for operating a DC arc discharge lamp in a start, glow, and run modes, the circuit arrangement comprising:
    a) a tapped transformer flyback converter circuit for providing the driving energy for operating the lamp during the start, glow and run modes;
    b) said tapped transformer flyback converter circuit including:
        i) a tapped point;
        ii) a primary winding for providing driving energy for operating the lamp during the run and glow modes; said primary winding having a first end coupled to a first end of said lamp and a second end connected to said tapped point; and
        iii) a secondary winding for driving the lamp during the start mode; said secondary winding having a first end coupled to said tapped point and a second end coupled to a second end of said lamp;
        iv) said second end of said primary winding being coupled to a second end of said lamp substantially other than through said secondary winding during the run and glow modes; said second end of said primary winding being coupled through said secondary winding to said second end of said lamp by a circuit including a resistance; the value of said resistance being sufficiently high so as to reduce power loss in said resistance to a tolerable level during the run mode;
    c) blocking means for providing a blocking function for a glow circuit during the start mode;
    d) a switching device serially coupled to said tapped point and being effective to control energy transferred through said tapped transformer flyback converter circuit; and
    e) an inductor member coupled in a common manner between the output of said glow circuit and a run circuit on one end and said discharge lamp on the opposite end thereof such that said inductor member develops sufficient voltage so as to operate said discharge lamp in said glow and run modes without the need of further inductive elements and said tapped transformer flyback circuit functions during said start mode without need of further inductive elements.

2. A circuit arrangement as claimed in claim 1 further comprising:
    a) at least one freewheeling diode associated with the tapped transformer; and
    b) at least one capacitive storage element associated with the tapped transformer.

3. A circuit arrangement as claimed in claim 1 further comprising a measurement and control means for measuring a voltage present at said discharge lamp and providing a control signal in response thereto, for controlling the switching device; said control signal being coupled to said switching device so as to control the voltage output of a start circuit and said glow circuit.

4. A circuit arrangement as claimed in claim 1 wherein the tapped transformer flyback converter circuit comprises means for operating as an energy transfer element.

5. A circuit arrangement as claimed in claim 1 wherein the tapped transformer flyback converter circuit comprises a flyback transformer.

6. A circuit arrangement as claimed in claim 1 wherein the tapped transformer flyback converter circuit comprises an autotransformer.

7. A circuit arrangement as claimed in claim 1 wherein said tapped transformer flyback circuit comprises a buck/boost type circuit.

8. A circuit arrangement as claimed in claim 1 wherein the value of said resistance is sufficiently high so as to reduce power loss in said resistance to less than a few percent of output power of the circuit arrangement during the run mode.

* * * * *